United States Patent [19]

Arbit

[11] 4,338,420

[45] Jul. 6, 1982

[54] ENHANCED WETTABILITY OF HDPE FILMS

[75] Inventor: Harold A. Arbit, Highland Park, N.J.

[73] Assignee: Mobil Oil Corporation, New York, N.Y.

[21] Appl. No.: 221,755

[22] Filed: Dec. 31, 1980

[51] Int. Cl.³ .............................. C08F 8/00; C08F 8/06
[52] U.S. Cl. ................................... 525/388; 525/326; 525/335; 528/483
[58] Field of Search ...................... 525/388, 326, 335; 528/483

[56] References Cited

U.S. PATENT DOCUMENTS

| | | | |
|---|---|---|---|
| 3,228,918 | 1/1966 | Tocker | 525/388 |
| 3,410,816 | 11/1968 | Mirabile et al. | 525/388 |
| 4,264,750 | 4/1981 | Anand et al. | 525/356 |

FOREIGN PATENT DOCUMENTS

| | | | |
|---|---|---|---|
| 2821806 | 11/1979 | Fed. Rep. of Germany | 528/483 |
| 143783 | 10/1980 | Fed. Rep. of Germany | 528/483 |
| 55-45755 | 3/1980 | Japan | 525/388 |
| 2025430 | 1/1980 | United Kingdom | 528/483 |

*Primary Examiner*—William F. Hamrock
*Attorney, Agent, or Firm*—C. A. Huggett; M. G. Gilman; J. P. O'Sullivan, Sr.

[57] ABSTRACT

This invention provides a method for enhancing wettability of high density polyethylene film, that comprises subjecting said film to plasma surface treatment using oxygen or argon gas atmosphere.

2 Claims, No Drawings

ENHANCED WETTABILITY OF HDPE FILMS

BACKGROUND OF THE INVENTION

1. Field of the Invention

This invention is concerned with high density polyethylene (HDPE) having enhanced wettability and printability.

2. Description of the Prior Art

Conventional surface treatments for polyolefin films include corona discharge, flame or chemical treatment. Insofar as is now known, plasma treatment of HDPE film has not been proposed.

SUMMARY OF THE INVENTION

This invention provides a method for enhancing wettability of high density polyethylene film, that comprises subjecting said film to plasma surface treatment using oxygen or argon gas atmosphere.

DESCRIPTION OF SPECIFIC EMBODIMENTS

Improved wettability of polymer films enhances the ability to print, coat, and/or bond them. Wettability, as is well known, is measured by the contact of distilled water with the film. Small contact angles, i.e. flat drops, indicate good wetting, whereas large angles, i.e. round drops, show poor wetting. By the method of this invention, the wettability of high density polyethylene (HDPE) is greatly enhanced.

High density polyethylene is well known in the art and is commercially available in bulk and in the form of film, usually biaxially oriented. Polymerization of ethylene to HDPE is carried out at low pressure in the presence of a Ziegler-Natta coordination catalyst.

As used herein, plasma is a high-temperature, ionized gas composed of electrons and positive ions in such relative numbers that the gaseous medium is essentially electrically neutral. The gaseous media found most effective within the contemplation of this invention are oxygen and argon.

EXAMPLE

Films of oriented high density polyethylene (HDPE) and biaxially oriented polypropylene (BOPP) were subjected to plasma surface treatment using oxygen, argon, nitrous oxide, and air environments. After plasma processing, contact angles were measured with distilled water and compared with untreated controls. Results are set forth in the Table.

TABLE

Effect of Plasma Surface Treatment on Wettability Control Angle, Degrees with Distilled Water

|  | Control | Oxygen | Argon | Nitrous Oxide | Air |
|---|---|---|---|---|---|
| HDPE | 90 | 43 | 43 | 60 | 50 |
| BOPP | 90 | 65 | 55 | 57 | 65 |

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A method for enhancing wettability of high density polyethylene film, that comprises subjecting said film to plasma surface treatment using oxygen or argon gas atmosphere.

2. High density polyethylene film treated by the method of claim 1.

* * * * *